United States Patent [19]

Staats

[11] 3,956,053
[45] May 11, 1976

[54] APPARATUS AND METHOD FOR BINDING WITH ADHESIVE COVERS

[75] Inventor: Henry N. Staats, Deerfield, Ill.

[73] Assignee: General Binding Corporation, Northbrook, Ill.

[22] Filed: Oct. 15, 1974

[21] Appl. No.: 514,301

[52] U.S. Cl. ............... 156/272; 156/380; 156/498; 11/1 AD
[51] Int. Cl.² ............... B29C 19/02; B32B 19/02; B32B 31/00
[58] Field of Search ............ 156/272, 380, 498, 499, 156/477 B; 281/21 R, 29, 3; 11/1 R, 1 AD

[56] References Cited
UNITED STATES PATENTS

| | | | |
|---|---|---|---|
| 2,762,421 | 9/1956 | Quinche et al. | 156/498 |
| 2,808,777 | 10/1957 | Roshkind | 156/272 |
| 3,413,669 | 12/1968 | Thorp | 11/5 |
| 3,477,194 | 11/1969 | Corrsin | 156/272 |
| 3,518,143 | 6/1970 | Fuhr | 156/212 |
| 3,531,358 | 9/1970 | Rost et al. | 156/475 |
| 3,560,290 | 2/1971 | Sendor et al. | 156/477 B |
| 3,804,691 | 4/1974 | Trivedi | 156/272 |

*Primary Examiner*—Douglas J. Drummond
*Attorney, Agent, or Firm*—Hill, Gross, Simpson, Van Santen, Steadman, Chiara & Simpson

[57] ABSTRACT

Apparatus for binding linear polyethylene covered books using a source of infrared heat energy applied externally at the backbone of a polyethylene cover to reactivate the hot melt adhesive on the cover.

8 Claims, 3 Drawing Figures

U.S. Patent    May 11, 1976    3,956,053
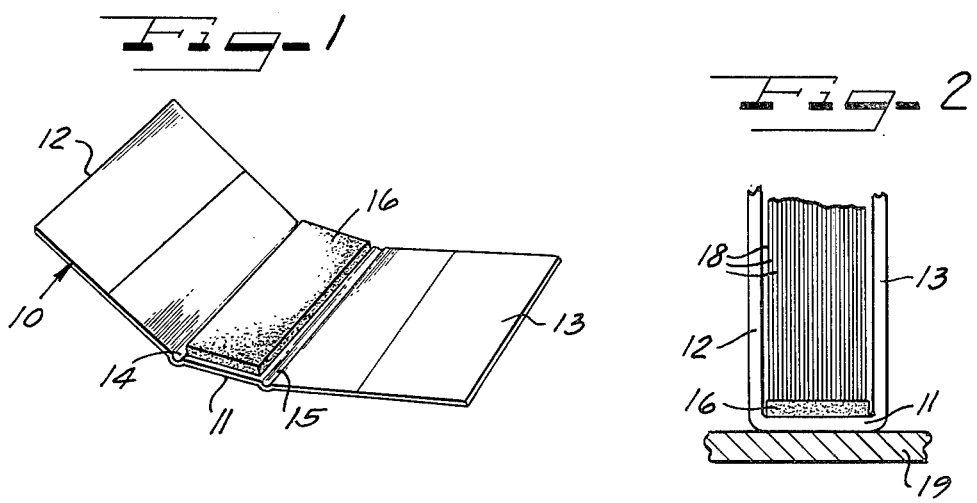
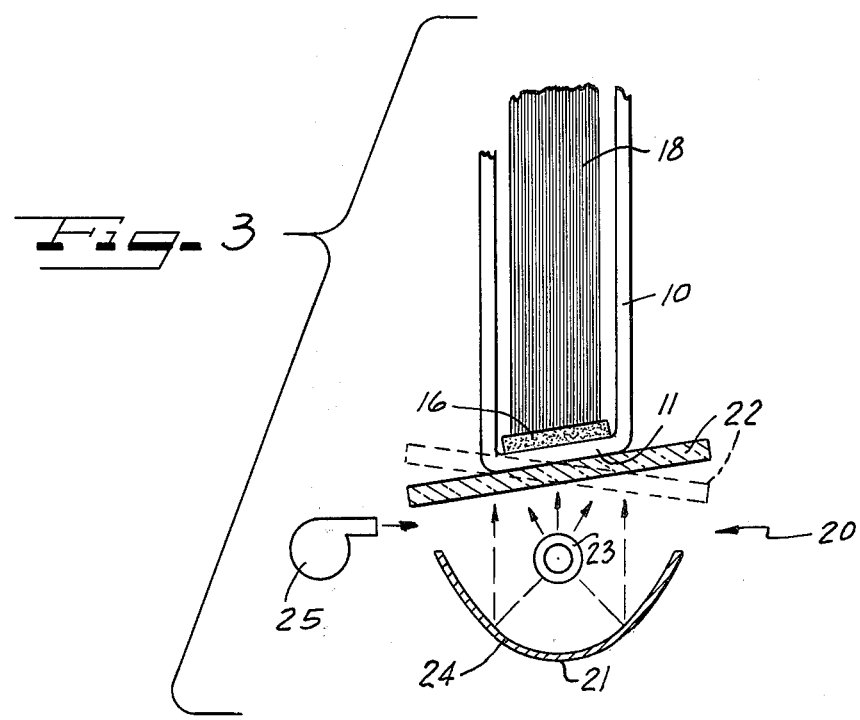

APPARATUS AND METHOD FOR BINDING WITH ADHESIVE COVERS

BACKGROUND OF THE INVENTION

This invention relates to apparatus for binding documents in a polyethylene cover having a heat reactivatable adhesive secured to the inside linear portion of the backbone thereof.

The general subject matter of this case insofar at least as it deals with binding covers having a heat reactivatable adhesive secured to the backbone or spine thereof is related to co-pending applications U.S. Ser. No. 265,305, U.S. Ser. No. 371,550, U.S. Ser. No. 468,133, U.S. Ser. No. 452,621 and U.S. Ser. No. 452,622, all assigned to the same assignee as this application.

In the original adhesive cover concept, conventional paper covers were used which have heat reactivatable adhesive secured to the inside backbone portion of the cover. The process of making these covers is implemented by placing the external backbone portion of the cover against a hot oscillating heater. Normally, temperatures in the 300° – 350°F range are used as the heater temperature. This elevated temperature range yields reasonably fast processing and is adequate in that it is not so hot as to scorch or otherwise damage paper or ink on the external backbone of the cover.

During the development of the adhesive cover concept it became desirable to use linear polyethylene for covers instead of conventional paper of card stock. The advantages of linear polyethylene include low cost, good hinging properties, ruggedness, long life, and excellent aesthetics. While these properties are most desirable in the linear polyethylene cover, other problems are created in its use. For example, in the process of reactivating the adhesive attached to the inside of the backbone, the exterior surface of the linear polyethylene cover is often subject to melting and/or distortion. In other words, the linear polyethylene melts quite readily when placed in contact with a heater of the type mentioned above which operates in the 300° – 350°F range and it does so before reactivation of the adhesive occurs. If the heater temperature is decreased to accommodate the linear polyethylene the process time is increased to a point where it is no longer commercially desirable. Adhesives with lower heat susceptibility also have been proposed, but to do this would increase the susceptibility of the book to self-destruction under high ambient temperatures. Other plastic sheet materials which might have a higher heat distortion point do not permit the introduction of a useful hinge with a significant commercial life.

Accordingly, it has become desirable to develop some other means of reactivating the adhesive if the linear polyethylene cover material is to be used and the above problems avoided.

SUMMARY OF THE INVENTION

It is, therefore, a principal object of this invention to provide an appropriate apparatus for binding a product such as loose sheets of paper with a linear polyethylene cover, having as part thereof a heat reactivatable adhesive material secured to the backbone of the cover.

Another object of the invention is to provide in such apparatus means which will allow activation of the adhesive without distorting the cover material.

Another object of this invention is to provide means for supplying the required temperature to the adhesive for melting it without having adverse effects on the linear polyethylene cover material.

Another object of this invention is to utilize in such apparatus a source of infrared heat energy for activating the adhesive on the cover backbone.

By way of summary, this invention includes a technique employing the use of infrared heat energy applied against the external backbone of a linear polyethylene cover so that the heat energy will travel through the backbone material and rapidly activate the adhesive secured to the inside of the cover backbone. In addition, the cover backbone is placed against an oscillating glass plate which helps to keep the cover backbone relatively cool.

Other objects and advantages of this invention will become more readily apparent when considering the description below in correction with the following drawings.

BRIEF DESCRIPTION OF THE DRAWINGS

FIG. 1 is an isometric view of a typical adhesive book cover with which the present invention would be employed;

FIG. 2 is a partial end elevation view of a book which could be bound in accordance with the present invention;

FIG. 3 is a schematic diagram of an infrared adhesive cover machine embodying the invention herein.

DESCRIPTION OF A PREFERRED EMBODIMENT

An adhesive cover of the type generally to be processed with the apparatus of this invention is shown in FIG. 1. Such a book cover shown generally as 10 is provided with a backbone 11 and front and back cover members 12 and 13. The cover is scribed or scored along lines 14 and 15 for flexing the cover members with respect to the backbone 11. A thermally activatable adhesive layer 16 is secured to the backbone 11.

In FIG. 2 the book cover 10 is shown in its folded state with a plurality of sheets 18 inserted between the cover members 12 and 13 and positioned on the adhesive layer 16 for attachment thereto. FIG. 2 also illustrates the book cover positioned on a heater 19. As explained in the introduction of this application, heaters operating in the range of 300° – 350°F are not satisfactory when the cover 10 is made of linear polyethylene.

FIG. 3 illustrates an arrangement embodying the invention herein when the cover 10 is made of linear polyethylene. In FIG. 3 the reference numeral 20 generally indicates the apparatus embodying the invention herein. The apparatus 20 comprises an infrared heat energy source 21 and a glass plate member 22. Member 22 may be oscillated manually or by any convenient mechanical means such as, for example, by the oscillating linkage shown in my prior application Ser. No. 265,305 mentioned above. The infrared heat energy source may be in the form of a quartz lamp 23 with an associated parabolic reflector 24, the unit being positioned to direct heat energy through the backbone 11 of the book cover 10 to the heat reactivatable adhesive layer 16. The backbone 11 of the cover 10 is placed against an oscillating glass plate for a purpose to be hereinafter further described. A cooling unit 25 directs air onto the oscillatable glass plate 22 to help keep it cool.

The described technique of using infrared heat energy to heat the external backbone 11 of the cover 10 is particularly effective in the linear polyethylene and glass are relatively transparent to infrared energy radiation. Thus, the heat energy from the infrared heat source 21 travels through the glass 22 and the backbone material 11 and activates the adhesive very rapidly. The infrared heat source can reach a temperature of approximately 1500°F. in approximately one second. The adhesive is actuated rapidly especially when it is in contact with products such as the sheets 18 to be bound because these readily absorb the infrared energy.

This system also has been undertaken without the oscillating glass plate member 22. While such an arrangement can work, the timing is quite critical and very little time elapses between the reactivation of the adhesive and the commencement of distortion of the cover material. This situation becomes more acute as pigmentation is increased in the cover material and the infrared transparency of the linear polyethylene is reduced. In other words, under those conditions the infrared absorbency of the linear polyethylene is increased. This situation is improved, however, when the cover backbone 11 is placed against the oscillating glass plate. This effects a cooling of the entire process, the glass remaining relatively cool since it is transparent to infrared energy. Thus, the cover backbone 11 also remains relatively cool because it is in contact with the glass plate 22. In order to effect additional cooling of the glass plate, cooling air may be directed onto the glass plate by means of a blower 25 or other suitable means. This assists in maintaining the glass plate at an appropriately lower temperature so that successive book binding operations are unaffected.

The technique described above permits linear polyethylene covered books to be bound on a cooled oscillating glass plate using a fixed infrared energy source and a parabolic reflector within a time range of approximately ten to thirty seconds, which is a satisfactory commercial range.

It will be noted that infrared energy passes through the oscillating glass plate without raising its temperature. Infrared energy also passes through linear polyethylene and only raises its temperature slightly to approximately 125°F, for example, but that is not enough to melt the linear polyethylene, thus overcoming the disadvantage of the previous types of heaters which operate in the range of 300° – 350°F. The infrared rays, of course, after passing through the linear polyethylene cover, continue into the adhesive and the product to be bound where they are absorbed and reactivate the adhesive. The blower keeps the glass cool, which in turn keeps the linear polyethylene cool and below the reactivation temperature.

Thus, it will be apparent that I have advantageously provided a novel means for processing an adhesive cover made of linear polyethylene overcoming disadvantages of the heaters formerly in use and permitting the use of an otherwise highly advantageous linear polyethylene cover material.

While a preferred embodiment of the invention has been disclosed, it will be appreciated that this has been shown by way of example only and the invention is not to be limited thereto as other variations probably will be readily apparent to those skilled in the art and the invention is to be given its fullest possible interpretation within the terms of the following claims.

I claim as my invention:

1. Apparatus for processing an adhesive cover comprising a material relatively transparent to infrared rays and having an infrared heat reactivatable adhesive secured on the internal upwardly facing surface of the cover backbone comprising:
   an oscillatable plate substantially transparent to infrared radiation interposed between the source of infrared heat energy and supporting the cover,
   a source of infrared heat disposed adjacent and below the backbone of the cover and said plate for directing heat energy through said plate and backbone to heat and activate the adhesive therein.

2. The apparatus of claim 1 wherein
   the source of infrared energy is a quartz lamp.

3. The apparatus of claim 1 wherein:
   said plate comprises a transparent glass; and
   cooling means disposed adjacent said plate for cooling same.

4. The apparatus of claim 1 wherein
   the source of infrared heat energy is a quartz lamp and wherein said plate comprises a substantially infrared transparent glass.

5. The apparatus of claim 1 wherein:
   said heat source comprises a heating element extending longitudinally of said backbone, said apparatus including:
   a parabolic reflector generally coaxial of said infrared heat source for detecting the heat energy therefrom through the plate toward the cover to be processed.

6. In a method for binding sheet products in a substantially infrared transparent cover having a backbone portion and heat reactivatable adhesive on the cover backbone, the steps of:
   placing the backbone of the cover loosely containing the sheet products to be bound therein upon a substantially infrared transparent support plate;
   oscillating said plate during the binding process; and
   while oscillating said plate, directing infrared heat energy through said plate and the cover to selectively melt the adhesive therein.

7. The method of claim 6 including the step of
   directing cooling air onto said plate to maintain the temperature of the linear polyethylene resting therein at a temperature below the activation temperature of the heat reactivatable adhesive.

8. The method of claim 7 wherein said cover is linear polyethylene.

* * * * *